(No Model.) 2 Sheets—Sheet 1.

J. CLAYTON.
WHEEL PLOW.

No. 364,899. Patented June 14, 1887.

WITNESSES
B. Fugitt
P. C. Massi

INVENTOR
John Clayton,
by Anderson & Smith
his Attorneys

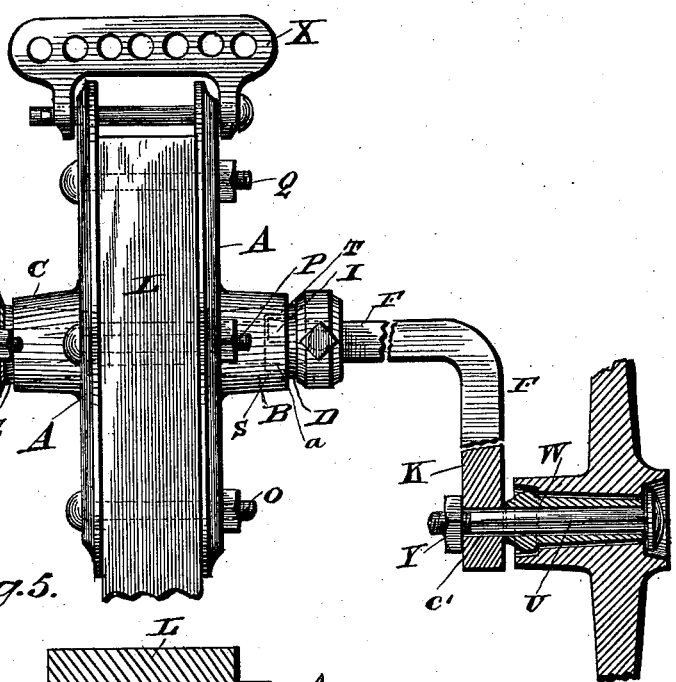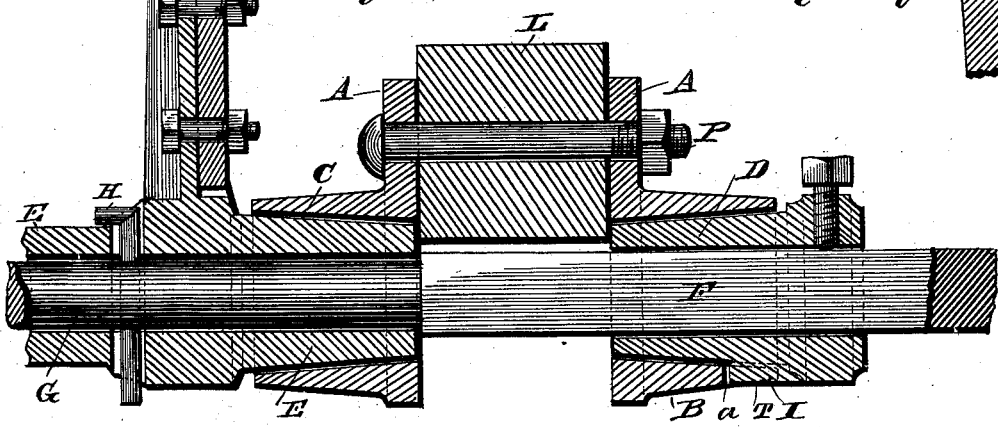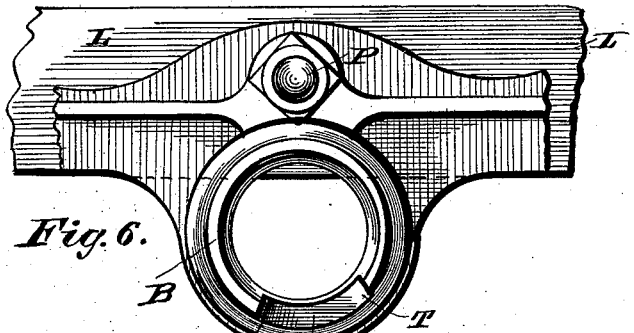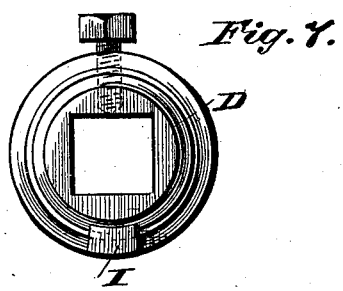

UNITED STATES PATENT OFFICE.

JOHN CLAYTON, OF WADENA, MINNESOTA.

WHEEL-PLOW.

SPECIFICATION forming part of Letters Patent No. 364,599, dated June 14, 1887.

Application filed February 15, 1887. Serial No. 227,687. (No model.)

*To all whom it may concern:*

Be it known that I, JOHN CLAYTON, a citizen of the United States, and a resident of Wadena, in the county of Wadena and State of Minnesota, have invented certain new and useful Improvements in Wheel-Plows; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
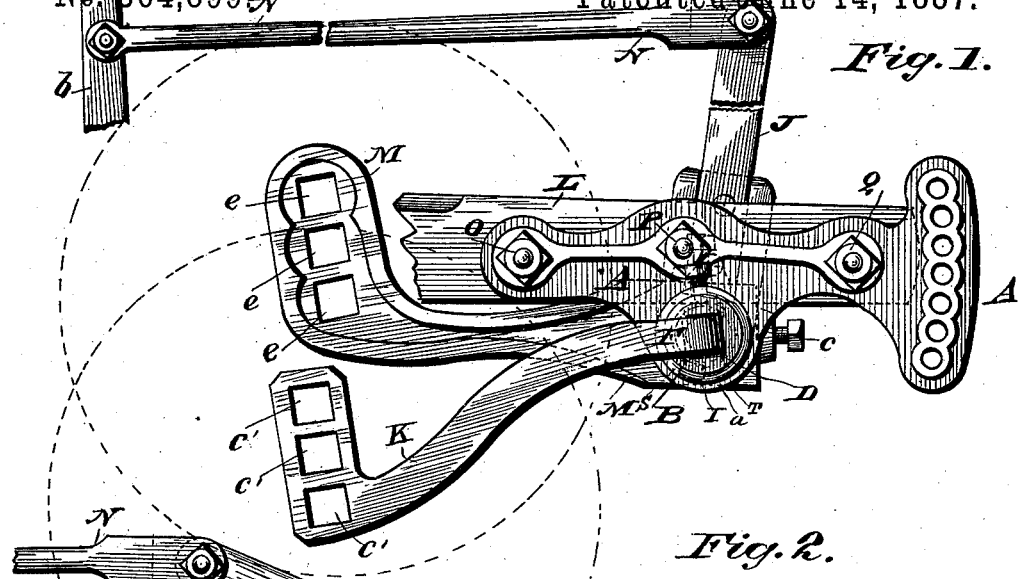
Figure 2:
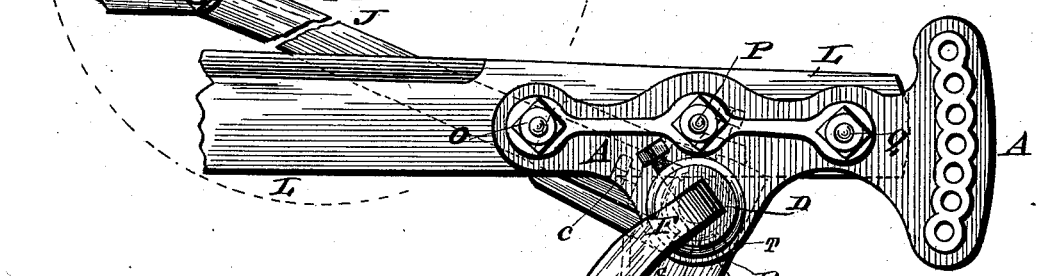
Figure 3:
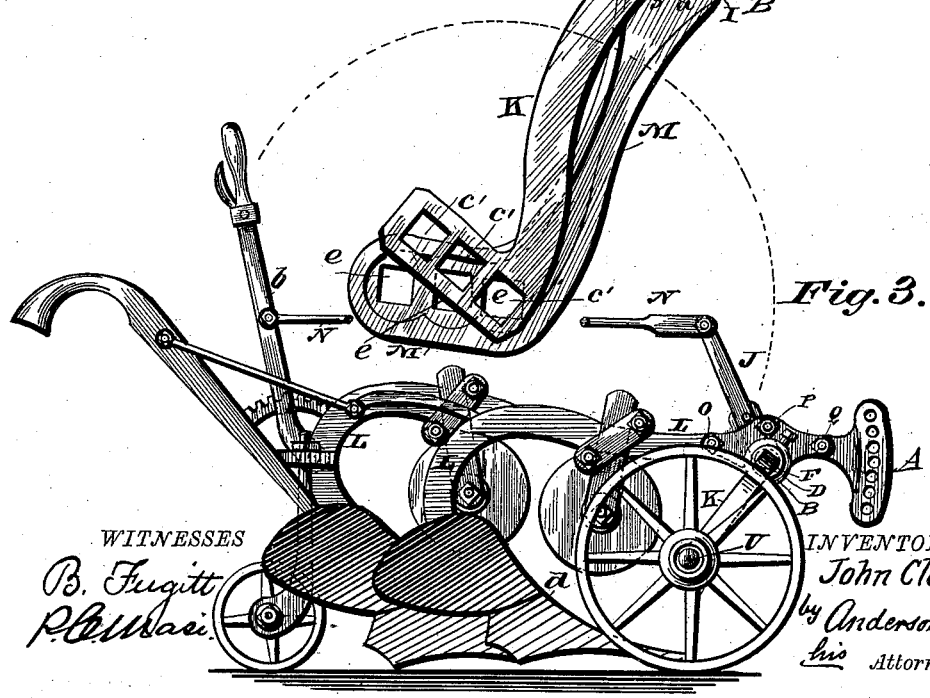

Figure 1 of the drawings is a representation of a portion of a plow-beam and its attachments, showing the same in one position. Fig. 2 is a similar view showing the same in another position. Fig. 3 is a side elevation of the plow complete. Fig. 4 is a plan view of the beam and its attachments. Fig. 5 is an enlarged vertical longitudinal section of the same. Figs. 6 and 7 are detail views of the projection B and sleeve D.

My invention relates to wheel-plows; and it consists in the construction and novel combination of parts, as hereinafter set forth.

The objects of the invention are to so arrange and combine the side clevises, bearing devices, sleeves, shaft, and lever as to secure independent action of the arm carrying the land-wheel, in raising and lowering the land-wheel to vary the depth of the furrow without changing the position of the furrow-wheel, which latter wheel will remain while the plow is at work level with the bottom of the plow-shares, until the land-wheel, by the action of the lever, shall be brought to the same level as the furrow-wheel, when, by continuing the motion of the lever, a stud-pin will engage a sleeve on which the arm of the landside wheel is secured and will cause the arms of each wheel to take bearings on said wheels, by which action the plows will be lifted above the ground to facilitate turning at the ends of furrows.

Referring by letter to the accompanying drawings, L designates a wooden plow-beam.

A A are the side clevises and bearing devices, which are provided on their outer faces with cone-frustum projections B C, having cylindrical-shaped holes or seats passing through them. The side clevises, A A, are secured to the front end of the plow-beam by bolts O P Q.

Into the conical cylindrical-shaped holes or seats of the projections B C are fitted the conical sleeves D and E. The sleeve D has a square seat passing through it, into which is fitted the rectangular portion of the shaft F. The sleeve E has a round or cylindrical hole passing through it, through which hole the cylindrical (in cross-section) part G of the shaft F passes.

The cylindrical projection B forming part of the side clevise has a recess, $a$, in its lower face, which receives the stud I on the conical sleeve D on its rear bearing, S, when the plows are in the ground, and receives said stud I on its forward bearing, T, when the plows are lifted out of the ground. This bearing is caused by the lever $b$, which is connected by the rod N to the arm J, engaging the stud-pin H in the sleeve E. The sleeve E passes through the land-wheel arm M, and the latter is secured to the sleeve E by set-screws $c$, so as to raise and lower the land-wheel by the action of the lever $b$ for regulating the depth of the furrow and for lifting the plows out of the ground. The furrow-wheel arm K is provided with three or more holes, $c'$, so that the axle-bolt U can be changed from one to the other of said holes to enable the operator when cutting the furrows to run the front plow, $d$, two or more inches below the ground. The land-wheel arm M is also provided with holes $e$ for changing the axle-bolt of the land-wheel when extra depth is required over and above what may be given by the lever $b$, engaging the stud-pin H in the cap or recess R. The furrow-wheel arm K and the shaft F may be made in one piece, or the arm K may be made separately and secured to the shaft F by set-screws, as is also the case with the land-wheel arm M.

The construction above described is applicable to beam-plows, or it may be used on steel-beam single or double furrow plows, as shown in Fig. 3.

In the case of steel-beam plows, single or double, the side clevises are made flaring or spreading, so as to give the necessary length to the cross-head X.

The square axle-bolts U of the wheels have a flanged cylindrical head slightly convex on its outer surface, which fits into the annular projections of the wheel-hubs to keep out the dust. The conical sleeve W has a square hole passing through it to receive the square axle-bolt U. The sleeve W projects into a seat in the inner end of the wheel-hub and excludes dust from between the frictional surfaces of the axle-bolt and wheel-hub. The sleeve W is secured in place by a nut Y.

Having described this invention, what I claim, and desire to secure by Letters Patent, is—

1. The combination of the shaft G F, the conical sleeve E, the corresponding clevis-plate, A, and the pin H, with the arm J, the lever $b$, and connecting-rod N, substantially as specified.

2. The combination of the shaft G F, the conical sleeves E D, the latter provided with the lug I, the clevis-plates A B, the latter provided with the recess $a$, having the shoulders S T, the pin H, the arm J, link-rod N, and lever $b$, substantially as specified.

In testimony whereof I affix my signature in presence of two witnesses.

JOHN CLAYTON.

Witnesses:
    D. E. JONES,
    A. G. PEAKE.